(12) United States Patent
Tsunekawa et al.

(10) Patent No.: US 7,026,064 B1
(45) Date of Patent: Apr. 11, 2006

(54) POLYESTER FILM AND METHOD FOR PRODUCING THE SAME

(75) Inventors: Tetsuya Tsunekawa, Otsu (JP); Shozi Nakajima, Otsu (JP); Yukari Nakamori, Shiga (JP); Masaaki Kotoura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/220,128

(22) PCT Filed: Mar. 7, 2000

(86) PCT No.: PCT/JP00/01367

§ 371 (c)(1),
(2), (4) Date: Aug. 28, 2002

(87) PCT Pub. No.: WO01/66336

PCT Pub. Date: Sep. 13, 2001

(51) Int. Cl.
*B32B 3/26* (2006.01)

(52) U.S. Cl. .............. 428/847.4; 428/831.2; 428/840.1; 428/847.2; 428/847.5; 428/847.7; 428/141; 428/458; 428/480; 428/900; 977/DIG. 1

(58) Field of Classification Search ............... 428/141, 428/458, 480, 900, 694 TR, 694 BR, 694 ST, 428/694 SQ, 831.2, 840.1, 847.2, 847.4, 428/847.5, 847.7; 977/DIG. 1
See application file for complete search history.

(56) References Cited

U.S. PATENT DOCUMENTS

| | | | | |
|---|---|---|---|---|
| 5,459,019 A | * | 10/1995 | Kato et al. | 430/270.11 |
| 5,523,143 A | * | 6/1996 | Hagemeyer et al. | 428/141 |
| 5,912,063 A | * | 6/1999 | Osawa et al. | 428/141 |
| 6,461,726 B1 | * | 10/2002 | Handa et al. | 428/327 |

* cited by examiner

*Primary Examiner*—William P. Watkins, III
(74) *Attorney, Agent, or Firm*—Kubovcik & Kubovcik

(57) ABSTRACT

The present invention provides a polyester film particularly useful as a base film for a magnetic recording medium such as cassette-type magnetic tape of a digital recording mode and a production process thereof. The polyester film is produced by irradiating UV light onto a surface of a film in a non-stretched stage or a stage prior to the completion of stretching to form fine protrusions on the surface. The fine protrusions on the film surface are specified by the ratio of 10-point average roughness Rz to center line average roughness Ra (Rz/Ra) on the surface (less than 20), the difference in concentration of carboxyl groups between the surface layer part and the inside of the film, and the number of fine protrusions.

9 Claims, No Drawings

# POLYESTER FILM AND METHOD FOR PRODUCING THE SAME

TECHNICAL FIELD

The present invention relates to a polyester film having fine protrusions formed on a surface. More specifically, the present invention relates to a polyester film that has good running durability and wear resistance and also has extremely good productivity and, when used as a base material for a magnetic recording medium particularly having a ferromagnetic metal thin film layer thereon, exhibits good output characteristics, and also relates to a process for producing the polyester film.

BACKGROUND ART

Polyester films can be formed in a continuous manner into large area films which cannot be produced with other resin materials. In addition, because of their good properties in strength, durability, transparency, flexibility and surface characteristics, they have been used in the fields needing them in large quantities, such as magnetic recording, industrial, packaging, agricultural and building materials. Among them, biaxially oriented polyester films have been used in various fields because of their good mechanical, thermal and electric properties and good chemical resistance. In particular, as base films for magnetic tapes, polyester films are unrivaled by other films in usefulness.

In recent years, in the process for processing a polyester film, the process for deposition and application of a magnetic layer during the magnetic recording medium production or the process for application of a heat sensitive transfer layer during the thermal transfer material production, it is demanded to increase the processing speed or to further improve the quality of a finished product. As these requirements grow, it is also required that polyester films have a film surface with more improved running durability and wear resistance.

To meet the requirements stated above, it is known to be effective to uniformly form fine protrusions on a surface of a polyester film. For example, a polyester film is known in which substantially spherical silica particles such as colloidal silica are contained to provide fine protrusions on the film surface (e.g., Japanese Unexamined Patent Application Publication No. 59-171623). A polyester film is also known in which a thin film layer containing fine particles that provide surface protrusions is laminated on a base layer (e.g., Japanese Unexamined Patent Application Publication Nos. 62-130848, 2-77431 and 8-30958).

On the other hand, magnetic recording media are becoming denser with each passing year and the wavelength employed for recording is becoming shorter, and the mode of recording is shifting from analogue form to digital form. When a ferromagnetic metal thin film layer is provided on one surface of a base film to produce a magnetic recording medium, the ferromagnetic metal thin film layer is usually provided on an ultra-flat film surface. In this case, since the ferromagnetic thin film layer generally has a thickness of as thin as about 0.02 to 0.5 µm, the surface geography of the base film may be directly reflected as the surface geography of the finished ferromagnetic thin film. Therefore, it is strongly required to reduce the height of surface protrusions of a base film and form ultra-fine protrusions at high density to provide surface smoothness and surface slipperiness, and development of films having a surface that satisfies these requirements has been demanded.

If ultra-fine particles are contained in the film surface in a large amount, however, generation of coarse protrusions caused by aggregation of the particles cannot be avoided and it would be difficult to form fine protrusions uniformly and at high density by using particles. Although addition of particles is effective for imparting surface slipperiness to the finished film and reducing the friction coefficient between the film and a conveyor roll during the film forming/processing process, problems still remain that coarse protrusions may drop off onto the conveyer roll so as to scratch the film and that the output characteristics of a magnetic tape produced using the film may be deteriorated. Therefore, it is quite difficult to employ the above-mentioned particle addition method as the means for forming ultra-fine protrusions at a high density in the industrial production.

An alternative method is known in which desired fine protrusions are formed on a surface by the action of crystallization of polyester without relying on the particle addition method (e.g., Japanese Unexamined Patent Application Publication No. 7-1575). According to the method utilizing the crystallization of polyester, the finished film can have good running durability and wear resistance since generation of voids around the particles can be prevented.

As the techniques for utilizing the crystallization of polyester, there are known a heat treatment method by winding a polyester film around a heated roll; a heat treatment method with an infrared heater; and a method of heating with a stenter. However, these methods have serious problems of (1) and (2) below. In these conventional heating methods, since the whole film is heated, there is also such a problem that troubles resulting from slack and adhesion of the film may frequently occur.

(1) It is difficult to stably produce high quality polyester films each having identical quality, since the number of fine protrusions would vary depending on apparatus-specific variable factors such as unevenness in temperature during the film formation.

(2) It is impossible to increase the film formation speed, since it takes much time to form ultra-fine protrusions by crystallization of polyester.

Alternatively, it has been employed to irradiate a film with ultraviolet light for modification of chemical properties and patterning of a film surface. For example, irradiation with ultraviolet light is employed in the coating or lamination of a chemical substance (e.g., UV-curable resin) on a surface of a polyester film to improve the adhesion, cohesion, antistatic properties, mechanical properties, optical properties and so on or in the patterning of the surface with a photosensitive resin (e.g., Japanese Unexamined Patent Application Publication No. 11-65130). There is a method in which an ultraviolet curable resin layer containing powder particles is provided on the film surface and the curable resin layer is then irradiated with ultraviolet light to form recessed-and-projecting patterns on the surface (e.g., Japanese Unexamined Patent Application Publication Nos. 11-277451 and 10-296944). As a method for chemically modifying the film surface, there is a method in which active oxygen is generated by the combination of ozone treatment and ultraviolet ray treatment to improve the adhesion of the film surface (e.g., Japanese Unexamined Patent Application Publication Nos. 5-68934 and 11-236460).

As mentioned above, irradiation of a film with ultraviolet light has been employed for denaturing a chemical substance applied on the film (e.g., curing of an ultraviolet curable resin layer) or for modifying the chemical properties of the film surface (e.g., improvement in adhesion of the surface).

The object of the present invention is to provide a high quality polyester film that has a surface superior in running durability and wear resistance, exhibits good output characteristics when used in a magnetic recording medium, and is superior in productivity, process simplification and production cost, and also to provide a production process for the polyester film.

DISCLOSURE OF INVENTION

The present inventors have made intensive studies for the purpose of achieving the above object. As a result, it has been found that a method for forming surface protrusions by an internal heating system utilizing electron transition caused by irradiation with ultraviolet light can make it possible to form fine protrusions on the irradiated surface stably, so that a polyester film surface can be produced that is far superior to that produced by the conventional surface protrusion formation technologies achieved by heat transfer or external radiant heating with hot air, a heated roll or an infrared heater. This finding leads to the accomplishment of the invention.

That is, the production process for a polyester film of the present invention is characterized in that at least one surface of a film is irradiated with ultraviolet light to form fine protrusions on the surface.

Since the irradiation with ultraviolet light enables to heat the film surface more selectively, the formation of fine protrusions on the polyester surface can be achieved quite readily. By the irradiation with ultraviolet light, a higher-order structure of the polyester can be formed. As a results fine protrusions can be formed stably and efficiently and a polyester film can be produced with good productivity that has surface properties good in wear resistance and running durability and suitable for use in a magnetic recording medium.

Using the film according to the present invention as a base film, a magnetic recording medium having good output characteristics can be produced stably.

The production process for a polyester film of the present invention encompasses the following desirable embodiments.

(a) The irradiation with ultraviolet light is performed with a light source having a relative intensity of light with wavelengths of 270 to 300 nm of 10% or more and containing substantially no wavelength shorter than 250 nm.

(b) The energy density employed during the ultraviolet light irradiation is 0.1 to 10 J/cm$^2$ and the irradiation time is 0.01 to 100 seconds.

(c) After irradiating at least one surface of the film with ultraviolet light, the film is stretched in a longitudinal direction and/or a transverse direction.

The film produced by the present process is characterized in that: (1) fine protrusions are present on at least one surface of the film, the ratio of 10-point average roughness Rz to center line average roughness Ra (Rz/Ra) on the surface is less than 20, and the concentration of carboxyl groups in the surface layer part of a thin layer which provides the surface is greater than that in the inside of the thin layer; and/or (2) a film surface portion that contains no protrusion with a protrusion height of 10 nm or more constitutes at least 5% of the whole film surface, and the number of protrusions with a protrusion height of not less than 3 nm and less than 5 nm in the film surface portion is not less than $1\times10^6$/mm$^2$ and less than $1\times10^9$/mm$^2$.

The polyester film encompasses the following desirable embodiments.

(a) The difference in concentration of carboxyl groups between the surface layer part of a thin layer which provides the surface having fine protrusions thereon and the inside of the thin layer is 0.001 or more.

(b) In the film surface portion that does not contain protrusions with a protrusion height of 10 nm or larger, the grain size at the protrusion height threshold value of 3 nm is not less than 1 nm$^2$ and less than 5000 nm$^2$.

(c) Particles with a particle diameter as mono-disperse particles and/or a primary particle diameter as aggregate particles of not less than 1 nm and less than 300 nm are contained in an amount of not less than 0.01% by weight and less 1% by weight.

(d) The film is a laminated film that is composed of A layer mainly composed of polyester A laminated on at least one surface of B layer mainly composed of polyester B.

BEST MODE FOR CARRYING OUT THE INVENTION

Hereinbelow, the present invention is illustrated in detail.

As used herein, the polyester refers to a polymer produced by condensation polymerization of a diol and a dicarboxylic acid. The dicarboxylic acid is typically terephthalic acid, isophthalic acid, phthalic acid, naphthalenedicarboxylic acid, adipic acid, sebacic acid or the like. The diol is typically ethylene glycol, trimethylene glycol, tetramethylene glycol, cyclohexane dimethanol or the like. Examples of the polyester include polymethylene terephthalate, polyethylene terephthalate, polypropylene terephthalate, polyethylene isophthalate, tetramethylene terephthalate, polyethylene-p-oxybenzoate, poly-1,4-cyclohexylene dimethylene terephthalate and polyethylene-2,6-naphthalate.

The polyester may be a homopolymer or copolymer. As a copolymerizable component, a diol component such as diethylene glycol, neopentyl glycol, and polyalkylene glycol; and a dicarboxylic acid component such as adipic acid, sebacic acid, phthalic acid, isophthalic acid and 2,6-naphthalenedicarboxylic acid, for example, may be used.

Besides the above mentioned dicarboylic acid components and diol components, aromatic hydroxycarboxylic acids such as p-hydroxybenzoic acid, m-hydroxybenzoic acid, 2,6-hydroxynaphtoic acid, p-aminophenol and p-aminobenzoic acid may be copolymerized in such a small amount that the advantages of the present invention are not hindered.

In the polyester film of the present invention, a heterogeneous polymer other than the polyester used as the matrix may be blended as long as the advantages of the present invention are not hindered. The heterogeneous polymer is preferably blended in an amount of 0.1 to 30% by weight, more preferably 0.5 to 15% by weight, most preferably 1 to 10% by weight, based on 100% by weight of the polyester. Preferred examples of the heterogeneous polymer include a polyimide, a polyether imide, a copolymerized polyester containing a mesogen group (a liquid crystal substituent) in the main chain, a polycarbonate and a styrene-based polymer with a number average molecular weight of 20000 or less.

A blend polymer prepared by appropriately blending the above-mentioned polyesters may also be used, such as a blend of polyethylene terephthalate and polyethylene-2,6-naphthalate.

The intrinsic viscosity of the polyester film of the present invention is preferably 0.55 to 1.0. The intrinsic viscosity is more preferably 0.60 to 0.9, and most preferably 0.65 to 0.8. If the intrinsic viscosity of the film exceeds 1.0, fine protrusions may not be formed on the polyester surface. If the intrinsic viscosity is less than 0.55, the breakage of the film may frequently occur during the film formation.

As used herein, the ultraviolet light (hereinafter, referred to as UV light) means light containing light with wavelengths of not longer than 400 nm. Particularly, it is preferred to irradiate light with wavelengths of 270 to 330 nm selectively. The light source used for this purpose is preferably a device capable of irradiating light having a relative intensity of light of 270 to 300 nm in wavelength of not less than 10%. More preferably, light with wavelengths of shorter than 250 nm is substantially cut and is not contained. In other words, it is preferred to use a light source capable of irradiating light having a relative intensity of light of shorter than 250 nm in wavelength of less than 1%. When the relative intensity of light of 270 to 300 nm in wavelength is less than 10%, fine protrusions may not be formed on the film surface if the energy density during the irradiation is not increased and it would take much time for formation of protrusions, which is also disadvantageous in the economical viewpoint. If light with wavelengths of less than 250 nm is irradiated onto the film, the photo-degradation of the polyester would increase and the wear resistance of the film surface would be frequently degraded, which should be kept in mind. The relative intensity of light with wavelengths of 270 to 300 nm is preferably 25% or greater, and more preferably 35% or greater.

As the light source used in the present invention, for example, a lamp such as a high pressure mercury lamp and a metal halide type of lamp and a laser beam irradiation device can be preferably used. Particularly preferred is a metal halide type of light source.

When a lamp is used as the light source, the mode for irradiating light may be of any type, such as converging type, parallel (semi-converging) type and diffusing type, and may be properly selected depending on the composition of the polymer used, the production conditions, the facility used for the production and the like.

When a laser beam irradiation device is used, the type of the device is not particularly restricted, but a device capable of irradiating a laser beam with wavelengths of 270 to 330 nm is particularly effective.

For the irradiation with UV light in the present invention, it is preferred to selectively use light with wavelengths of 270 to 330 nm. Therefore, it may also be preferred to use various optical filters in combination. The optical filter includes, for example, an optical coherence filter, a bandpass filter, a short wavelength cutting filter, a long wavelength cutting filter and a absorptive material such as quartz glass and a colored glass.

In the present invention, it is preferred to irradiate with UV light having an energy density of 0.1 to 10 J/cm$^2$ for an irradiation time of 0.01 to 100 seconds. As used herein, the energy density refers to an integrated value which is measured with a UV meter equipped with a sensor capable of detecting light of 300 to 390 nm in wavelength.

If the energy density is less than 0.1 J/cm$^2$ or the irradiation time is shorter than 0.01 second, then fine protrusions are not likely to be formed. On the contrary, if the energy density exceeds 10 J/cm$^2$ or the irradiation time exceeds 100 seconds, then deterioration of the surface would be increased and the wear resistance would be degraded.

The more preferred irradiation conditions include the energy density of 0.2 to 5 J/cm$^2$ and the irradiation time of 0.1 to 20 seconds. The still more preferred irradiation conditions include the energy density of 0.4 to 3 J/cm$^2$ and the irradiation time of 0.2 to 10 seconds.

In the present invention, after irradiating the film surface with UV light, it is preferred to stretch the film in a longitudinal direction and/or a transverse direction. Particularly preferably, the irradiation with UV light is performed prior to stretching a biaxially oriented polyester film in a longitudinal direction and/or a transverse direction. As used herein, the biaxially oriented polyester film refers to a polyester film oriented both in a transverse direction and a machine direction. The transverse direction and the machine direction mean a longitudinal direction and a transverse direction of the film, respectively.

In the polyester film of the present invention, the degree of orientation fn of the film surface is preferably 0.08 to 0.20, more preferably 0.01 to 0.19, in view of the scratch resistance.

The film to be irradiated with UV light may be a non-stretched film produced by the extrusion/casting process or a film produced by stretching the non-stretched film in a transverse direction and/or a machine direction. Among these, a non-stretched film, a slightly oriented film which has been slightly stretched in a transverse direction, or a mono-axially stretched film which has been stretched in a transverse direction is preferred for the irradiation with UV light. It is most preferred to irradiate a non-stretched film with UV light.

In the polyester film of the present invention which is produced by the above-mentioned UV light irradiation method, the ratio of 10-point average roughness Rz to center line average roughness Ra (Rz/Ra) on at least one surface of the film is less than 20; and the concentration of carboxyl groups in the surface layer part of a thin layer which provides the surface is greater than that in the inside of the thin layer. If the ratio of 10-point average roughness Rz to center line average roughness Ra (Rz/Ra) is 20 or more, then the film surface protrusions would be nonuniform in height. As a result, wear resistance of the film would be unsatisfactory and, when used in a magnetic tape, output characteristics of the magnetic tape would also be unsatisfactory.

To improve the wear resistance of the film and the output characteristics of the magnetic tape produced using the film by the formation of fine protrusions on the film surface, it is preferred that the surface roughness Rz/Ra value be lower. However, it is quite difficult to produce a film with a Rz/Ra value of less than 2 in the industrial scale and, if produced, the productivity of the film is often poor. Therefore, the lower limit of the Rz/Ra value is preferably 2. The ratio of 10-point average roughness Rz to center line average roughness Ra (Rz/Ra) on at least one surface of the film is preferably less than 15, more preferably less than 10.

The center line average roughness Ra of the surface is preferably 0.3 to 200 nm, more preferably 0.4 to 100 nm, still more preferably 0.5 to 30 nm.

In the film of the present invention, to achieve the intended film properties of the present invention, it is required that the concentration of carboxyl groups in the surface layer part of a thin layer which provides the surface having fine protrusions thereon be greater than that in the inside of the thin layer. The difference in concentration of carboxyl groups between the surface layer part of a thin layer which provides the surface having fine protrusions thereon and the inside of the thin layer (concentration of carboxyl groups in the surface layer part-concentration of carboxyl group in the inside) is preferably not less than 0.001 and less than 0.020, more preferably not less than 0.003 and less than 0.015. If the difference in concentration of carboxyl groups between the surface layer part and the inside of the thin layer is 0.020 or greater, then the surface degradation would occur and therefore wear resistance would be deteriorated, which should be kept in mind.

In the film of the present invention, a film surface portion that contains no protrusion with 10 nm or larger in height constitutes at least 5%, preferably at least 10%, of the whole film surface, and the number of protrusions with not lower than 3 nm and lower than 5 nm in protrusion height on the film surface portion is not less than $1 \times 10^6/\text{mm}^2$ and less than $1 \times 10^9/\text{mm}^2$, preferably not less than $2 \times 10^6/\text{mm}^2$ and less than $5 \times 10^8/\text{mm}^2$, more preferably not less than $5 \times 10^6/\text{mm}^2$ and less than $8 \times 10^7/\text{mm}^2$. Although it is industrially possible to form only protrusions with less than 10 nm in height on the whole surface, the upper limit of the ratio of the film surface portion containing no protrusion with less than 10 nm in height is preferably 95% or less. If the ratio does not fall within the range, running durability of the film would become poor, problems of deterioration in handling properties and generation of films surface defects (e.g., scratches) would occur during the film formation/processing process, and a problem of contamination during the process would also occur.

In the film surface portion that contains no protrusion with 10 nm or greater in thickness (as determined using an atomic force microscope (AFM) at the field of view of 0.5 μm×0.5 μm), the grain size at the protrusion height threshold value of 3 nm is preferably not less than 1 $\text{nm}^2$ and less than 5000 $\text{nm}^2$.

If the number of surface protrusions with not less than 3 nm and less than 5 nm in protrusion height on the film surface portion containing no protrusion with 10 nm or greater in height does not fall within the above-mentioned range, it is not preferable since it would be difficult to achieve good running durability or scratch resistance. The formation of fine protrusions greatly in number is further desirable, since the friction between the film and an object to be contact with the film can be reduced and, therefore, scratch resistance of the film and output characteristics of a magnetic tape produced using the film can be further improved.

In the film of the present invention, when the number of the protrusions with 3 nm or more in height is determined under the enlarged field of 5 μm×5 μm to take an AFM image in the above-mentioned AFM method, it is preferred that the number of the protrusions be $2 \times 10^3$ to $1 \times 10^8$ protrusions/$\text{mm}^2$. More preferably, the number of the protrusions is $2 \times 10^4$ to $5 \times 10^7$ protrusions/$\text{mm}^2$ in view of running durability and scratch resistance.

Since the fine protrusions on the film surface formed by irradiation with UV light of the present invention are not principally those formed around core particles added as seeds, they have lower hardness compared with fine protrusions formed around core particles. The fine protrusions formed by the present process are relatively soft. Therefore, even when the film is run on a plastic guide, the scraping of the guide is reduced and a problem resulting from the scraping of the guide surface can be eliminated. Since the protrusions are relatively soft and the protrusion height is uniform, a problem of wearing of a MR head (Magnetic Resistance Head) utilizing magnetic resistance effect for use in magnetic recording media can also be eliminated.

Whether the protrusions on the film surface formed by irradiation with UV light of the present invention are those induced from core particles added as seeds (hereinafter, also referred to as "core particle-induced protrusions") or not can be determined by the following method, and it is preferred that the percentage of the protrusions not induced from core particles be at least 70%.

A film is etched with a suitable solvent to remove the beneath portions of protrusions to be determined in the direction of film thickness. If a material that constitutes the protrusions remains as an insoluble matter, then the protrusions are presumed as those induced from particles added externally or deposited internally (I). If no insoluble matter remains, then the protrusions are presumed as those not induced from particles (II). The solvent that is preferably used for this purpose may be a mixed solvent such as phenol/carbon tetrachloride (weight ratio: 6:4). The frequencies of (I) and (II) are determined by this method with the field of view of about 1 $\text{mm}^2$. The percentage of the particle-induced protrusions is expressed by (II)/[(I)+(II)].

Alternatively, for determining whether the surface protrusions are those induced from particles or not, a method may also be employed in which an ultra-thin sectional slice of a film is observed with a transmission electron microscope (TEM) and a protrusion whose length taken in the direction of film thickness exceeds the average film surface protrusion height is presumed as a protrusion induced from a particle. The method for determining whether the surface protrusions are those induced from particles or not is not restricted to those methods mentioned above and other suitable method may be employed.

In the polyester film of the present invention, it is not necessary to add particles in view of the surface protrusion formation. However, inorganic or organic particles, other various additives such as antioxidizing agents, antistatic agents and nucleating agents may be added, as long as the advantages of the present invention are not hindered.

The inorganic particles include, for example, particles of an oxide such as silicon oxide, aluminum oxide, magnesium oxide and titanium oxide; a composite oxide such as kaolin, talk and montmorillionite; a carbonate such as calcium carbonate and barium carbonate; a sulfate such as calcium sulfate and barium sulfate; a titanate such as barium titanate and potassium titanate; a phosphate such as calcium phosphate tribasic, calcium phosphate dibasic and calcium phosphate monobasic; or the like, but are not restricted to these compounds. Two or more of these compounds may be used in combination depending on the intended use.

The organic particles include, for example, particles of polystyrene or crosslinked polystyrene, crosslinked particles of stylene-acrylate or an acrylate, vinyl-based particles such as those of styrene-methacrylate or a methacrylate, particles of benzoguanamine-formaldehyde, silicone or polytetrafluoroethylene or the like. However, they are not restricted to these compounds and any particles may be used as long as at least portion of the particles are organic polymer microparticles insoluble in polyester.

When these particles are contained, the particle diameter in the form of monodisperse particles and/or the primary particle diameter in the form of aggregate particles is not less than 1 nm and less than 300 nm, preferably not less than 5 nm and less than 200 nm, and still more preferably not less than 10 nm and less than 100 nm. If the particle diameter is less than 1 nm, then the particles are likely to aggregate and coarse protrusion may be formed. If the particle diameter is greater than 300 nm, then it is difficult to achieve good scraping resistance of the film and output characteristics of a magnetic tape produced using the film. The content of the particles is not less than 0.01% by weight and less than 1% by weight, preferably not less than 0.05% by weight and less than 0.5% by weight. If the content of the particle exceeds 1% by weight, then it is not only difficult to produce the film of the present invention but also generation of coarse protrusion is likely to occur due to the aggregation of the particles and, therefore, it would become difficult to achieve satisfactory scraping resistance of the film and output characteristics of a magnetic tape produced using the film.

When the film is a monolayered polyester film, fine protrusions may be formed by effecting the irradiation with UV light according to the present invention only in the extreme surface layer part of the film. Accordingly, although the film of the present invention may be a monolayered film, the film is preferably of a laminated structure for the purpose of forming fine protrusions greatly in number or forming different types of surface protrusions on the surface and the back surface of the film. When the film has a laminated structure, the thin film of the surface means a laminated layer part on the film surface, whereas when the film has a monolayered structure, it means the whole film.

When the film has a laminated structure, it is preferred to laminate a polyester layer (A layer) on which fine protrusions are formed by the irradiation with UV light onto at least one surface of other polyester layer (B layer). For an A/B two-layered structure, the B layer may contain particles or not, but it is preferred to contain particles in view of handling of the film and winding properties. When particles are contained in both A layer and B layer, it is preferred that B layer contain larger particles than those contained in A layer.

When the film of the present invention is used as a base film for a magnetic recording medium, it is desirable that a magnetic layer be provided on the surface where the surface protrusions are formed by irradiation with UV light (i.e., the surface of the A layer side when the film has a laminated structure), but is not particularly restricted.

In the present invention, it preferred that the difference in crystallinity parameter between the surface layer part of at least one surface and the central layer part of the film as determined by Raman spectrometry be 1.0 or less. If the difference in crystallinity parameter determined by Raman spectrometry exceeds 1.0, then the amount of curls generated during the storage in the form of a roll under high temperature/high humidity conditions is likely to increase and the surface evenness of the film is likely to become poor. For a magnetic tape application, poor surface evenness may cause undesirable adhesion between the tape and a head, resulting in deterioration of output characteristics.

The whole thickness of the film of the present invention may be suitably specified depending on the application purpose and the intended use. For magnetic material application, the whole thickness is preferably 1 to 20 µm in general. Particularly, it is preferred that the whole thickness be 2 to 9 µm for high density magnetic recording coating-type medium application and be 3 to 9 µm for high density magnetic recording deposition-type medium application. For floppy disk application, the whole thickness is preferably 30 to 100 µm. For industrial material application, the whole thickness is preferably 1 to 6 µm for thermal transfer ribbon application, 0.5 to 10 µm for electric capacitor application and 0.5 to 5 µm for heat sensitive mimeograph stencil application.

Hereinbelow, the production process for a polyester film is explained more in detail. However, the present invention is not limited by the following explanation of production examples.

The polyester used in the present invention may be any one produced by the conventional method. When particles are contained in the polyester, the particles may be added at any stage, for example, prior to polymerization, during polymerization or after polymerization. However, it is preferred to add the particles by dissolving the particles in a diol component (e.g., ethylene glycol) to obtain a slurry and then mixing and dispersing the slurry in the polyester prior to completion of the polymerization to thereby polymerize the ethylene glycol with a predetermined dicarboxyl acid component. To further enhance the advantages of the present invention, it is effective to heat-treat the slurry of the particles in ethylene glycol at a temperature of 150 to 230° C., particularly 180 to 210° C., for 30 minutes to 5 hours, preferably 1 to 3 hours.

As the method for controlling the content of the particles added, it is effective to employ a method of controlling the content by distilling high concentration particle master pellets with a polymer that substantially contains no particle during the film formation.

Hereinbelow, the production of an A/B two-layered laminated polyester film that is composed of A layer composed of polyester A and B layer composed of polyester B is illustrated as an example. The polyester used in the present invention is preferably polyethylene terephthalate (PET) mainly composed of ethylene terephthalate. PET may be produced by direct polymerization method or DMT method. For the production by DMT method, it is preferred to use calcium acetate as a transesterification catalyst. During the polymerization step, it is also preferred to use (but not limited to) a germanium compound as a polymerization catalyst. As the germanium catalyst, as known in the art, the following materials may be used: (1) amorphous germanium oxide, (2) crystalline germanium oxide with 5 µm or smaller, (3) a solution prepared by dissolving germanium oxide in glycol in the presence of an alkali metal or an alkaline earth metal and (4) a solution of germanium oxide in glycol prepared by dissolving germanium oxide in water, adding glycol to the solution and then evaporating the solution to remove water.

The solution haze of the polyester may be 5% or less, preferably 3% or less, more preferably 1% or less. If the solution haze exceeds 5%, the amount of deposited particles and particles added in the solution would be increased and, therefore, a surface desired in the present invention may not be formed and scraping resistance may be degraded.

The raw materials for polyester A and polyester B are separately dried in vacuo at 180° C. for at least 3 hours, supplied respectively to two single- or twin-screw extruders which has been heated to 270 to 310° C. under nitrogen gas stream or in vacuo so that the intrinsic viscosity is not decreased, and then extruded from a T die as a sheet. Polyester A and polyester B are laminated together in a polymer tube or a die.

Subsequently, the molten laminated sheet is electrostatically caused to closely contact with a drum that has been cooled at a surface temperature of 10 to 40° C. and cooled to solidify, thereby obtaining a substantially amorphous non-stretched laminated film. To enhance the advantages of the present invention, it is preferred to control the lamination thickness of each layer by controlling the amount of a polymer extruded by means of a static mixer and a gear pump provided in the polymer pass.

The resultant non-stretched film is irradiated with UV light having an energy density of 0.1 to 10 $J/cm^2$ for an irradiation time ranging from 0.01 to 100 seconds. As stated above, the irradiation with UV light may be performed after obtaining the non-stretched film, after stretching the film slightly or after stretching the film in a transverse and/or machine direction. In the present invention, it is preferred to irradiate the non-stretched film. The atmosphere employed for the irradiation with UV light may be under room temperature conditions or heated conditions of 50 to 200° C.

In the present invention, it is preferred to irradiate with UV light under room temperature conditions, in view of good productivity such as simplification of the process.

Subsequently, if required, the non-stretched film is biaxially stretched to cause the biaxial orientation. As the stretching method, successive biaxial stretching method or simultaneous biaxial stretching method may be employed. To produce the film of the present invention without breakage, it is effective to use successive biaxial stretching method in which a film is first stretched in a longitudinal direction and then in a transverse direction. The stretching in a longitudinal direction is usually performed using a roll, and the stretching temperature is 80 to 180° C., preferably 90 to 150° C. The stretching in a longitudinal direction is preferably performed in one step or multiple steps (two or more steps) at a temperature higher than the glass transition temperature Tg of polyester A by 15° C. or more at a stretching ratio of 2 to 8 times, preferably 2.5 to 7 times, whereby the film of the present invention can be produced readily.

The stretching in a transverse direction is preferably performed using a known tenter at a stretching temperature of 90 to 160° C., preferably 100 to 150° C. at a stretching ratio of 2.5 to 6 times, preferably 3 to 5 times at a stretching rate of 3000 to 30000%/min. Subsequently, the stretched film is heat-treated. The heat treatment may be performed at a temperature of 180 to 250° C., particularly 200 to 240° C. for 1 to 20 seconds. Subsequently, after intermediately cooled at 100 to 180° C., the film is cooled to room temperature and rolled up, if necessary, while relaxing in a transverse and/or machine direction, whereby the desired biaxially oriented polyester film can be produced. If it is desired to increase the strength of the film in a transverse or machine direction, it is preferred to stretch the film again in a transverse/machine direction prior to the heat treatment. In this case, preferred stretching conditions include a stretching temperature of 110 to 150° C. and the stretching ratio of 1.1 to 1.8.

In the production example mentioned above, the production of the film using a successive twin-screw extruder is illustrated as an example. However, the film may be produced using a simultaneous twin-screw extruder. In this case, it is preferred to use a stretching apparatus of which driving mode for a clip is a linear motor mode.

[Methods for Evaluation of Physical Properties]

(1) Relative Intensity of Light with 270 to 300 nm in Wavelength (%)

The emission spectrum of light from a light source (wavelength (nm) vs. luminescence intensity (mJ)) is measured using a spectroscope under conditions of 25° C., 60 RH and 1 atm. The data of the emission spectra obtained were analyzed and the relative intensity of light with 270 to 300 nm in wavelength was determined according to the following equation.

Relative intensity=[(integrated value of luminescence intensity of 270–300 nm in emission spectra)/ maximum luminescence intensity]×100(%)

The maximum luminescence intensity refers to a luminescence intensity of wavelength which shows the maximum intensity in the emission spectra. For a UV lamp preferably used in the present invention, the maximum luminescence intensity is a luminescence intensity of 365 nm or 254 nm.

(2) Energy Density of UV Light (J/cm$^2$)

An integral value was determined using an UV meter manufactured by Japan Storage Battery Co., Ltd. (UV350N model), and an integrated value was determined.

(3) Concentration of Carboxyl Groups in a Film

Measurement was made using ESCA according to the method described in the literature by Nakayama et al. (Y. Nakayama et al., "Surface and Interface analysis", vol. 24, 711 (1996)). The apparatus and conditions used for the measurement are given below. In a measurement sample, carboxyl groups were vapor-phase labeled with trifluoroethanol. The binding energy was adjusted so that the peak C1s value became 284.6 eV. The concentration of carboxyl groups was calculated as a ratio relative to the number of carbon atoms in the detection depth.

For the determination of the concentration of carboxyl groups in the inside of the film of the thin layer, the measurement was made by adding hexafluoroisopropanol dropwise onto the film surface on a spin coater to dissolve the film surface or, alternatively, shaving a portion of the surface layer part with a razor to reduce the thickness of the thin layer to ½ of the original thickness and then doing the above-mentioned carboxyl group labeling.

(Measuring Device)
Apparatus body: SSX-100 (manufactured by SSI, USA)
X ray source: Al-Kα (10 kv, 20 mA)

(Conditions for Measurement)
Degree of vacuum: $5\times10^{-7}$ Pa
Photo escape angle: 35°

(4) Surface Roughness Ra, Rz of a Film

The center line average roughness Ra and the 10-point average roughness Rz (both were measured in nm) were measured by use of a high precision thin film gap measuring instrument ET-10 produced by Kosaka Kenkyusho. The measurement conditions are given below. Twenty cycles of measurement were conducted while the film was being scanned in a transverse direction, and then the resultant values were averaged.

(Conditions for Measurement)
Radius of feeler tip: 0.5 μm
Load of feeler: 5 mg
Length of measurement: 0.5 mm
Cut-off value: 0.08 mm (5) Determination of the Ratio of a Film Surface Portion Containing no Protrusion with 10 nm or Greater in Height Relative to the Whole Film Surface (One Surface of the Film)

An atomic force microscope (AFM) was used to determine the film surface under the conditions given below.

(Conditions for Measurement)
Device: NanoScope III AFM (manufactured by Digital Instruments)
Canti lever: Silicon single crystal
Mode of scanning: Tapping mode
Scanning area: 0.5 μm×0.5 μm
Scanning rate: 0.5 Hz An AFM image with a field of 0.5 μm×0.5 μm was taken randomly 100 times. The ratio of frequency of the images having no protrusion with 10 nm or greater in height was determined as the ratio of the film surface portion having no protrusion with 10 nm or greater in height relative to the whole film surface (%).

(6) Number of Protrusions with not Less than 3 nm and Less than 5 nm in Height in the Film Surface Portion Having no Protrusion with not Less than 10 nm in Protrusion Height.

Among the AFM images taken in the measurement of (5) above, AFM images having no protrusion with 10 nm or greater in protrusion height were used. The number of protrusions with 3 nm or greater in protrusion height and the number of protrusions with 5 nm or greater in protrusion height were counted using a protrusion height threshold value of 3 nm and 5 nm in the field of 0.5 µm×0.5 µm, respectively. The number of protrusions with 5 nm or greater in protrusion height was subtracted from the number of protrusions with 3 nm or greater in protrusion height, and the resultant values were averaged and then converted to the number of protrusions per 1 mm².

(7) Grain Size at a Threshold Value for Protrusion Height of 3 nm

Among the AFM images taken in the measurement in (5) above, AFM images having no protrusion with 10 nm or greater in protrusion height were used. The grain size was determined using a protrusion height threshold value of 3 nm and the resultant values were averaged.

(8) Number of Protrusions with 3 nm or Greater in Height as Determined by AFM Measurement Under the Observation Field of 5 µm×5 µm AFM images were taken in the same manner as in (5) above, except that the scanning area in the AFM measurement conditions was changed to 5 µm×5 µm (protrusions with 10 nm or greater in protrusion height might be contained). The measurement of protrusions with 3 nm or greater in height was performed 20 times, the resultant values were averaged, and then the resultant values were averaged and then converted to the number of protrusions per 1 mm².

(9) Crystallization Parameter (ΔTcg)

Measurement was made with DSC (differential scanning calorimeter) II model manufactured by Perkin-Elmer. The conditions for measurement are given below. Ten mg of a sample was set in a DSC device and melted at 300° C. for 5 minutes, followed by quenching of the melt in liquid nitrogen. The resultant specimen was heated at 10° C./min. and checked in respect of its glass transition point Tg.

Temperature rise was continued, and a crystallizing exothermic peak temperature derived from a glass state was measured as a cold crystallization temperature (Tcc); an endothermic peak temperature derived from crystal fusion was measured as a fusion temperature (Tm); and a crystallizing exothermic peak temperature derived from during temperature drop was measured as a crystallization temperature in temperature drop (Tmc).

The difference between Tcc and Tg (Tcc−Tg) is defined as the crystallization parameter (ΔTcg).

(10) Intrinsic Viscosity of a Film

The intrinsic viscosity was determined as a value measured at 25° C. at a concentration of 0.1 g/ml in ortho-chlorophenol. The unit was expressed in [dl/g].

(11) Solution Haze of a Polymer

Two grams of a polyester was dissolved in 20 ml of a mixed solvent phenol/carbon tetrachloride (weight ratio of 6/4) and the solution haze was determined according to ASTM-D-1003-52 using a light pass of 20 mm.

(12) Crystallinity Parameter by Raman Spectroscopy

The crystallinity was evaluated in the surface layer part and the central layer part of the film with a laser Raman microprobe.

The apparatus and conditions used for the measurement are given below.

The surface layer part refers to a layer part lying below the film surface at a depth of 1 µm, and the central layer part refers to a layer part lying at a depth of about ½ of the film thickness±0.5 µm.

A film sample to be measured was embedded in an epoxy resin, the cross section was polished, and the surface layer part and the central layer part were measured on Raman spectra (n=5). The half band width of 1730 $cm^{-1}$ which corresponded to the stretching vibration of carboxyl was defined as a parameter of crystallinity.

A smaller parameter value means a higher crystallinity of a film.

Device for measurement: Rmanor U-1000 (Jovin-Yvon)
    Microprobe: Olympus BH-2 model
    Objective lends: 100×
Light source: Argon ion laser (5145A)
Detector: PM: RCA31034/Photon Counting System
Conditions for measurement:

| Conditions for measurement: | SLIT | 1000 µm |
|---|---|---|
| | LASER | 100 mW |
| | GATE TIME | 1.0 second |
| | SCAN SPEED | 12 $cm^{-1}$/min |
| | SAMPLING INTERVAL | 0.2 $cm^{-1}$ |
| | REPEAT TIME | 6 |

(13) Average Particle Diameter of Particles

A polyester is removed from a film, by means of plasma ashing, whereby particles were caused to expose from external view. The conditions for this procedure are selected so that the polymer is ashed but the particles can be protected almost completely from being impaired. Observation is made of the particles by a scanning electron microscope (SEM), and the resultant particle images are treated by an image analyzer. The magnification of SEM is set to be approximately 2000 to 30000 times, and the field in single measurement is chosen from about 10 to 50 µm in one side. In terms of 5000 or more particles in number observed at varied locations, the volume average diameter d is determined by the particle diameter and volume fraction.

When the particles are of an organic nature or the like and are apt to become greatly impaired due to plasma ashing at low temperature, the following method may be employed.

The film is observed in cross section by a transmission electron microscope (TEM) at a magnification of 3000 to 400000 times. The thickness of a slice for TEM inspection is set at about 100 nm and measured at a field of 500 or more at varied locations. The volume average particle diameter d is obtained in the same manner as above.

(14) Content of Particles

Compositional analysis was made by means of the microscopic FT-IR method (Fourier's transformation microscopy infrared spectroscopy). The content of particles was determined based on the ratio of peak arising from a carbonyl group in a polyester to peak arising from materials other than the polyester. In order to convert the peak height ratio to the corresponding weight ratio, the ratio of polyester weight to a total weight of polyester plus other materials was determined from a calibration curve prepared in advance with use of samples of known weights. An X-ray microanalyzer may also be employed, if required. In the case where a solvent can be selectively used which dissolve a polyester but does not dissolve a particle material, the polyester was dissolved, and the particles were separated by centrifugally from the polyester. Thus, the weight percentage of the particle material was determined.

(15) Thickness of Film Laminate

A laminated film is observed cross-sectionally at an accelerating voltage of 100 kV with use of a transmission electron microscope (H-600 model, manufactured by Hitachi Ltd.) and by means of an ultra slicing method ($RuO_4$ dyeing). The interface of the laminate is captured, from which the thickness of the laminate is determined. Magnifications are not particularly restricted since they are usually chosen depending on the thickness of laminates to be measured. However, 1 tens of thousands to 10 tens of thousands are suitable. When the laminate interface is hardly recognized, a depth distribution of inorganic ions is determined by means of a secondary ion mass spectrometer. The maximum value in the direction of depth is determined on the basis of the surface, and a depth found equivalent to ½ of the maximum value is taken as the thickness of the laminate.

(16) Scratch Resistance

Scratching test was made by means of a continuous loading scratch resistance tester HEIDON-18 under the conditions given below and the depth of scratches were determined with a non-contact roughness meter TOPO-3D manufactured by WYKO.

[Conditions for Evaluation]

Scratching needle: made of sapphire

| | |
|---|---|
| Radius of curvature of tip | 200 μm |
| Loading: | 50 g |
| Running rate: | 10 cm/min |

Loading:
Running Rate:
On the basis of the depth of scratches, the films were ranked as follows.

Scratches with 0.5 μm or less in depth: excellent
Scratches with 0.5 to 2 μm in depth: good
Scratches with 2 μm or greater in depth: unacceptable

(17) Stability of Surface Protrusion Formation

The state of surface protrusion formation was evaluated by determining a surface roughness Ra as measured by the method in (4) above and the number of surface protrusions as determined by the method in (8) above at 10 locations in a transverse direction and 30 locations in a longitudinal direction of the film as a 10 cm spacing, and the state of the film was ranked on the following scales on the basis of the variation in determined values.

○: almost no variation was observed in both surface roughness Ra and number of surface protrusions, and the surface quality was stable;

Δ: a variation by about 20 to 40% was observed in either surface roughness Ra or number of surface protrusions; and x: a variation by 40% or more was observed in either surface roughness Ra or number of surface protrusions.

(18) Output Characteristics of ME Tape

An ME tape was measured on C/N at 7 MHz±1 MHz using a commercially available VTR device for Hi 8 (EV-BS3000, manufactured by Sony Corporation). The C/N value thus obtained was compared to that of a commercial video tape for Hi 8 (120-minute, ME) and ranked on the following scales.

+3 dB or more: ◉
+1 dB or more, less than +3 dB: ○
less than 1 dB: x

When the determined value for output characteristics of a tape is greater than that of the commercial video tape for Hi 8 (120 minutes ME) by +1 dB, the tape is deemed to be satisfactory as a VTR tape of digital recording mode.

(19) Output Characteristics of MP Tape

An MP tape was measured on C/N at 7 MHz±1 MHz using a commercial VTR device for Hi 8 (EV-BS3000, manufactured by Sony Corporation). The C/N value thus obtained was compared to that of a commercial video tape for Hi 8 (120 minutes, ME) and ranked on the following scales.

+3 dB or more: ◉
+1 dB or more, less than +3 dB: ○
less than 1 dB: x

Hereinbelow, the present invention will be illustrated by the following examples and comparative examples.

EXAMPLE 1

An A/B two-layered laminated film composed of the following polyester A and polyester B was produced.

Polyester A:

Bis(hydroxymethyl) terephthalate was prepared from dimethyl terephthalate and ethylene glycol using magnesium acetate as a catalyst in the conventional manner. The bis(hydroxymethyl) terephthalate was polymerized using germanium oxide as a catalyst, thereby obtaining pellets of polyethylene terephthalate which contained fine particles generated from polymerization catalyst residues (i.e., inside particles) as little as possible (intrinsic viscosity: 0.65, melting point: 258° C., ΔTcg: 82° C., solution haze: 0.1%).

Polyester B:

Pellets of polyethylene terephthalate were prepared in the conventional manner in which 0.2% by weight of spherical crosslinked polystyrene particles with an average particle diameter of 0.2 μm and 0.05% by weight of spherical crosslinked polystyrene particles with an average particle diameter of 0.3 μm (intrinsic viscosity: 0.62, melting point: 258° C., ΔTcg: 80° C.).

The pellets prepared above were separately dried in vacuo at 180° C. for 3 hours and then supplied to two extruders, respectively. The polyester A and polyester B were molten at 290° C. and 285° C., respectively, filtered separately in the conventional manner, and then laminated through a rectangular intermixing block (feed block) for two-layered lamination. The thickness of each layer was adjusted by controlling the rotation speed of a gear pump placed on each line to control the extruder output. Subsequently, the resultant laminate was caused to closely contact with a casting drum of 25° C. in surface temperature electrostatically and then cooled to solidify, thereby giving a non-stretched film.

The non-stretched film was irradiated with UV light from the A layer side of the film at 25° C. for 1.5 second in an atmosphere of 1 atm with adjusting the irradiation length so that the energy density became 0.7 J/cm². As the light source of UV light, a metal halide type UV lamp manufactured by Japan Storage Battery Co., Ltd. (Type A, MAN500L, 120 W/cm, relative intensity of 270–300 nm of 38% (maximum light emission intensity: 365 nm)) was used, and wavelengths less than 250 nm were cut off.

The UV-irradiated non-stretched film was introduced to a transverse stretching apparatus consisting of plural heated rolls and stretched 3.4 times in a longitudinal direction in two steps at 95° C. Subsequently, the film was introduced in a stenter with the film end being cramped with a clip and then stretched 4.2 times in a transverse direction at 95° C. at a stretching rate of 250%/min. The biaxially stretched film was stretched again 1.2 times in a longitudinal direction at 120° C. The resultant film was heat-treated at 210° C. for 5 seconds under constant tension, thereby producing a biaxially oriented polyester film having an A layer thickness of 6 μm and a whole thickness of 7 μm. The conditions for UV light irradiation are shown in Table 1, and the results of evaluation of the film are shown in Tables 2 and 3.

A deposit layer of cobalt-nickel alloy (Ni: 20% by weight) was provided in a thickness of 200 nm on the surface of the A layer side of the film using a continuous vacuum deposition apparatus in the presence of a trace amount of oxygen. A carbon protective layer was formed on the deposit layer surface in the conventional manner, and the resultant film was slit in a 8 mm width to obtain a pancake. From the pancake, a 200 m tape was taken and installed in a cassette as a cassette tape with a ferromagnetic metal thin film layer (ME tape). The output characteristics of the tape were evaluated and the results are shown in Table 3.

As shown in these tables, according to the present process utilizing irradiation with UV light, fine protrusions could be formed at high speed and stably and a polyester film stable in quality was obtained.

EXAMPLES 2–4

Substantially the same manner as in Example 1 was performed, except that the conditions for UV light irradiation were changed to those shown in Table 1, thereby obtaining a biaxially oriented polyester film with a thickness of 7 μm. In Example 2, a high pressure mercury lamp was used; in Example 3, the same high power type of metal halide lamp as that used in Example 1 was used; and in Example 4, a low pressure mercury lamp was used. In the low pressure mercury lamp, the relative intensity of light with wavelength of 270–300 nm was 5% and light with wavelengths of less than 250 nm were contained.

The film obtained in Example 2 using a high pressure mercury lamp as the light source had the film characteristics according to the present invention, although the number of surface protrusions was somewhat reduced.

As shown in Example 3, in the case where the energy density is increased, the surface fine protrusions can be formed satisfactorily even when the irradiation time is reduced to ⅓ of that employed in Example 1. In the film obtained in Example 4 using a low pressure mercury lamp with wavelengths of less than 250 nm, the surface deterioration was promoted, scratch resistance was somewhat reduced, and surface roughness and number of protrusions were also reduced.

A ferromagnetic metal thin film layer was formed on the A layer-side surface of each of the films, thereby producing cassette tapes (ME tapes).

EXAMPLE 5

In this example, a mono-layered polyester film is exemplified. Pellets of polyethylene terephthalate polymerized in the conventional manner using, as polymerization catalysts, 0.10% by weight of magnesium acetate, 0.03% by weight of antimony trioxide, 0.35% by weight of dimethyl phenylphosphate (intrinsic viscosity: 0.62, melting point: 258° C., ΔTcg: 51° C., solution haze: 0.7%) and pellets of polyester A produced in Example 1 were separately dried, mixed together at a ratio of 3:7, supplied to an extruder, extruded at 280° C. and then cooled, thereby obtaining an non-stretched film. The non-stretched film was introduced to a converging UV light irradiation device and irradiated with UV light from the both surfaces of the film for 1.0 second. The UV lamp used was of the same type as in Example 1. Subsequently, the film was stretched 3.5 times in a longitudinal direction at 90° C., and then stretched 4.8 times in a transverse direction at 95° C. at a stretching rate of 2000%/min. The resultant film was subjected to heat treatment at 220° C. for 5 seconds under constant tension, thereby obtaining a biaxially oriented polyester film with a thickness of 7 μm.

In the resultant mono-layered film, fine protrusions were formed stably and the surface quality was stable.

A ferromagnetic metal thin film layer was formed on the surface of the resultant film which did not contact with a casting drum in the same manner as in Example 1, thereby producing a cassette tape (ME tape).

EXAMPLE 6

A biaxially oriented polyester film with a thickness of 7 μm was produced substantially the same manner as in Example 5, except that the power of the lamp used for the UV light irradiation was increased to shorten the irradiation time. By increasing the power of the lamp, numerous fine surface protrusions could be formed at high speed by UV irradiation for as short as 0.5 second. In this case, a polyester film with stable surface quality could be formed continuously.

A ferromagnetic metal thin film layer was formed on the film in the same manner as in Example 5, thereby obtaining a cassette tape (ME tape).

EXAMPLE 7

In this example, the polyester prepared in Example 5 was used as polyester A, and polyester A containing no particles prepared in Example 1 was used as polyester B. These polyesters were separately supplied to two extruders and polyester A and polyester B were molten at 275° C. and 280° C., respectively, extruded and laminated through a rectangular intermixing block (feed block) for three-layered lamination. The resultant laminate was electrostatically caused to closely contact with a casting drum of 20° C. in surface temperature, thereby giving a non-stretched A/B/A three-layered film. The non-stretched film was irradiation with the same light source of UV light as in Example 3 from the both surfaces of the film for 1.0 second. The resultant film was stretched in a longitudinal direction, in a transverse direction and a transverse direction in turn in the same manner as in Example 1, heat-treated at 220° C. under constant tension for 10 seconds, was relaxed at a ratio of 2% in a transverse direction, thereby obtaining a biaxially oriented polyester film with an A layer thickness of 1.5 µm and a whole thickness of 7 µm.

A ferromagnetic metal thin film layer was formed on the surface of film which did not contact with a casting drum in the same manner as in Example 1, thereby obtaining a cassette tape (ME tape).

EXAMPLE 8

An A/B two-layered lamination film was produced. Substantially the same procedure as in Example 1 was performed, except that the polyester A prepared in Example 1 blended with 0.3% by weight of spherical silica particles with an average particle diameter of 0.03 µm was used as the polymer for the A layer side. UV light was irradiated on the film surface of the A layer side for 2.0 seconds with adjusting the irradiation length so that energy density of 0.7 J/cm$^2$ was achieved. In this manner, a biaxially oriented laminated film with an A-layer thickness of 6 µm and a whole thickness of 7 µm was obtained.

A ferromagnetic metal thin film layer was formed on the A layer-side surface of the film in the same manner as in Example 1, thereby obtaining a cassette tape (ME tape).

EXAMPLE 9

A biaxially oriented polyester film and a cassette tape (ME tape) were produced substantially in the same manner as in Example 8, except that the particles to be blended with polyester A were alumina particles with a primary particle diameter of 0.02 µm and the conditions for UV irradiation were changed to those given in Table 1.

COMPARATIVE EXAMPLES 1 AND 2

In these comparative examples, an example of forming fine protrusions on a film surface by the conventional heat treatment method is illustrated.

Comparative Example 1 illustrates an A/B/A type of laminated film of the same type as in Example 7, and Comparative Example 2 illustrates a mono-layered film of the same type as in Example 5. Substantially the same procedure as in Example 7 or 5 was performed, except that the non-stretched film was not irradiated with UV light but was subjected to heat treatment instead. In this manner, biaxially oriented polyester films with a thickness of 7 µm and cassette tapes (ME tapes) were produced.

For the A/B/A type of laminated film of Comparative Example 1, the non-stretched film was heated with a radiation heater so that the film surface temperature became 185° C. and heat-treated at the same temperature for 4 seconds.

For the mono-layered film of Comparative Example 2, the non-stretched film was heated so that the film surface temperature became 150° C. and heat-treated at the same temperature for 20 seconds.

The results of evaluation of the resultant films are shown in Tables 2 and 3. In these Comparative Examples, surface protrusions by the action of crystallization could be formed on the film surface and the surfaces superior in scratch resistance were achieved. However, the protrusions on the film surface were non-uniform in size, the surface roughness Ra and the number of fine protrusions varied by more than 40%, and therefore it was fail to produce films with stable quality.

COMPARATIVE EXAMPLES 3 AND 4

In these comparative examples, an example of forming fine protrusions on the film surface by providing a thin film layer produced by the conventional particle addition method.

In Comparative Example 3, for the formation of an A/B type of two-layered laminated film, a non-stretched film was produced substantially in the same manner as in Example 8, except that spherical silica particles with an average particle diameter of 0.03 µm were blended to the A layer polymer in an amount of 1.0% by weight (intrinsic viscosity: 0.65, melting point: 259° C., ΔTcg: 81° C.).

The non-stretched film was subjected to substantially the same procedure as in Example 1, except that irradiation with UV light was not performed, thereby obtaining a biaxially stretched film. As shown in Table 2, since the amount of particles added was increased for the sake of forming numerous fine protrusions, coarse protrusions were formed due to aggregation of the particles, the number of protrusions was decreased, and scraping resistance of the film and output characteristics of a magnetic tape using the film were deteriorated.

In Comparative Example 4, an A/B two-layered non-stretched film was prepared in the same manner as in Example 1, and then monoaxially stretched 3.4 times in a longitudinal direction. On the surface of the A layer side, a coating solution with the following formula which contained water soluble polymers and fine particles with a particle diameter of 20 nm was coated so that the solid coating concentration became 20 mg/m$^2$.

| [Water soluble coating solution] | |
|---|---|
| Methyl cellulose | 0.10% by weight |
| Water soluble polyester | 0.3% by weight |
| Aminoethysilane coupling agent | 0.01% by weight |
| Ultra-fine silica (average particle diameter: 20 nm) | 0.03% by weight |

The resultant film was stretched 4.2 times in a transverse direction at 110° C. with a tenter. The film was stretched 1.3 times in a longitudinal direction at 120° C. followed by heat treatment at 210° C. for 5 seconds under constant tension, thereby obtaining a biaxially oriented polyester film with a B layer thickness of 1 µm and a whole thickness of 7 µm. On the surface of the coating layer side, a ferromagnetic thin film layer was formed in the same manner as in Example 1, thereby obtaining a cassette tape (ME tape).

In these comparative examples, although the film surface having fine protrusions thereon could be achieved, no surface portion that did not contain protrusions with 10 nm or larger in height could not be taken from the film surface in the AFM evaluation (field: 0.5 µm×0.5 µm). Since the surface protrusions formed by such coating method are mainly composed of protrusions generated from particles in the coating, particles are present on the film surface in an exposed state and, therefore, are likely to be drop off. As a result, a problem in film surface defect may occur that such particles are scraped during the film formation and slitting process, causing scratches on the film surface. The scratch resistance of the film and the output characteristics of a ME tape using the film were deteriorated.

TABLE 1

|  | Light source of UV light | | Energy | |
|---|---|---|---|---|
|  | Type | Relative intensity of light with 270–300 nm wavelengths (%) | density during irradiation (J/cm²) | Irradiation time (sec) |
| Ex. 1 | Metal halide, parallel type | 38 | 0.7 | 1.5 |
| Ex. 2 | High pressure mercury, Parallel type | 15 | 0.7 | 1.5 |
| Ex. 3 | Metal halide, parallel type | 38 | 2.7 | 0.5 |
| Ex. 4 | Low pressure mercury, Parallel type | 5 | 0.7 | 0.5 |
| Ex. 5 | Metal halide, converging type | 38 | 0.5 | 1.0 |
| Ex. 6 | Metal halide, converging type | 38 | 3.0 | 0.5 |
| Ex. 7 | Metal halide, converging type | 38 | 2.0 | 1.0 |
| Ex. 8 | Metal halide, parallel type | 38 | 0.7 | 2.0 |
| Ex. 9 | Metal halide, parallel type | 38 | 0.5 | 1.0 |

TABLE 2

|  |  | Surface roughness (A) | | Difference in concentration of carboxyl groups between surface part and inside of thin layer | Surface portion containing no protrusion with 10 nm or more in height | | |
|---|---|---|---|---|---|---|---|
|  | Film configuration | Ra (nm) | Rz/Ra |  | Number of surface protrusions with 3–5 nm in height (×10⁴/mm²) | Ratio relative to the whole surface (%) | Grain size (nm²) |
| Ex. 1 | A/B | 1.8 | 6.5 | 0.006 | 4800 | 91 | 1080 |
| Ex. 2 | A/B | 1.3 | 7.8 | 0.004 | 3300 | 88 | 600 |
| Ex. 3 | A/B | 2.3 | 6.0 | 0.012 | 6200 | 93 | 1480 |
| Ex. 4 | A/B | 1.3 | 5.9 | 0.018 | 1800 | 90 | 320 |
| Ex. 5 | Monolayer (A) | 1.4 | 6.8 | 0.007 | 680 | 45 | 1900 |
| Ex. 6 | Monolayer (A) | 1.8 | 12 | 0.014 | 1100 | 66 | 3200 |
| Ex. 7 | A/B/A | 1.1 | 9.1 | 0.014 | 1200 | 77 | 3800 |
| Ex. 8 | A/B | 1.6 | 14.5 | 0.014 | 850 | 81 | 3500 |
| Ex. 9 | A/B | 2.2 | 16 | 0.002 | 230 | 52 | 1200 |
| C. Ex. 1 | A/B/A | 18 | 21 | 0.000 | 86 | 10 | 1000 |
| C. Ex. 2 | Monolayer (A) | 17 | 22 | 0.000 | 120 | 4 | 750 |
| C. Ex. 3 | A/B | 9.0 | 21 | 0.000 | 680 | 2.5 | 5800 |
| C. Ex. 4 | A/B | 3.8 | 15 | 0.000 | None | 0 | None |

TABLE 3

|  | Scratch resistance | Stability in surface protrusion formation | Output characteristics of ME tape |
|---|---|---|---|
| Ex. 1 | Excellent | ○ | ◎ |
| Ex. 2 | Excellent | ○ | ◎ |
| Ex. 3 | Excellent | ○ | ◎ |
| Ex. 4 | Good | ○ | ◎ |
| Ex. 5 | Excellent | ○ | ◎ |
| Ex. 6 | Excellent | ○ | ○ |
| Ex. 7 | Excellent | ○ | ◎ |
| Ex. 8 | Excellent | ○ | ○ |
| Ex. 9 | Excellent | ○ | ○ |
| C. EX. 1 | Good | X | X |
| C. EX. 2 | Good | X | X |
| C. EX. 3 | Unacceptable | Δ | X |
| C. EX. 4 | Unacceptable | X | X |

EXAMPLE 10

An A/B two-layered laminated film was prepared.

As polyester A, pellets of polyethylene terephthalate that was polymerized in the conventional manner using 0.06% by weight of magnesium acetate, 0.008% by weight of antimony trioxide and 0.02% by weight of trimethyl phosphate as polymerization catalysts and blended with 0.1% by weight of spherical crosslinked polystyrene particles with an average particle diameter of 0.3 μm and 0.1% by weight of alumina particles with a primary particle diameter of 0.02 μm (intrinsic viscosity: 0.62, melting point: 259° C., ΔTcg: 81° C.) were used.

As polyester B, pellets of polyethylene terephthalate blended in the conventional manner with 0.5% by weight of spherical crosslinked polystyrene particles with an average particle diameter of 0.3 μm and 0.07% by weight of spherical crosslinked polystyrene particles with an average particle diameter of 0.6 μm were used.

The pellets were separately dried in vacuo at 180° C. for 3 hours and then supplied to two extruders, respectively. The polyester A and polyester B were molten at 285° C., and then laminated through a rectangular intermixing block (feed block) for two-layered lamination. The resultant laminate was caused to closely contact a casting drum with surface temperature of 25° C. electrostatically and then cooled to solidify, thereby giving a non-stretched film. The non-stretched film was irradiated with UV light on the surface of the A layer side of the film for 2.5 second with adjusting the irradiation length so that the energy density became 3.0 J/cm². The resultant film was introduced to a transverse stretching apparatus consisting of plural heated rolls and stretched 3.4 times in a longitudinal direction in three steps at 90° C. The film was stretched 3.8 times in a transverse direction at 100° C. at a stretching rate of 2000%/min. The biaxially stretched film was stretched again 1.6 times in a longitudinal direction at 130° C. The resultant film was heat-treated at 210° C. for 5 seconds under constant tension, thereby producing a biaxially oriented polyester film with an A layer thickness of 6.6 μm and a whole thickness of 7 μm. The conditions for UV light irradiation are shown in Table 4, and the results of evaluation of the film are shown in Tables 5 and 6.

A magnetic coating and a non-magnetic coating having the compositions given below were coated in an overlaying manner on the surface of the A layer side of the film using an extrusion coater (the upper layer is the magnetic coating in a coating thickness of 0.2 μm; the lower layer is the non-magnetic coating in a coating thickness of 1.8 μm), magnetically oriented, and then dried. On the surface of the opposite side, a back coat layer having the composition given below was formed in the conventional manner. The resultant film was calendered using a small test calender (steel roll/steel roll, 5 steps) at 85° C. at a linear pressure of 200 kg/cm, and then cured at 60° C. for 48 hours. The film destined to form into tapes was slit to thereby produce a pancake. From the pancake, a tape was taken and installed in a cassette, thereby producing a cassette tape having a metal-coated magnetic layer.

[Composition of magnetic coating]

| | |
|---|---|
| Ferromagnetic metal powder | 100 parts by weight |
| Sodium sulfonate-modified vinyl chloride copolymer | 10 parts by weight |
| Sodium sulfonate-modified polyurethane | 10 parts by weight |
| Polyisocyanate | 5 parts by weight |
| Stearic acid | 1.5 parts by weight |
| Oleic acid | 1 part by weight |
| Carbon black | 1 part by weight |
| Alumina | 10 parts by weight |
| Methyl ethyl ketone | 75 parts by weight |
| Cyclohexanone | 75 parts by weight |
| Toluene | 75 parts by weight |

[Composition of non-magnetic lower layer]

| | |
|---|---|
| Titanium oxide | 100 parts by weight |
| Carbon black | 10 parts by weight |
| Sodium sulfonate-modified vinyl chloride copolymer | 10 parts by weight |
| Sodium sulfonate-modified polyurethane | 10 parts by weight |
| Methyl ethyl ketone | 30 parts by weight |
| Methyl isobutyl ketone | 30 parts by weight |
| Toluene | 30 parts by weight |

[Composition of back coat layer]

| | |
|---|---|
| Carbon black (average particle diameter: 20 nm) | 95 parts by weight |
| Carbon black (average particle diameter: 280 nm) | 5 parts by weight |
| α-Alumina | 0.1 part by weight |
| Zinc oxide | 0.3 part by weight |
| Sodium sulfonate-modified vinyl chloride copolymer | 30 parts by weight |
| Sodium sulfonate-modified polyurethane | 20 parts by weight |
| Methyl ethyl ketone | 300 parts by weight |
| Cyclohexanone | 200 parts by weight |
| Toluene | 100 parts by weight |

As shown in the tables, according to the present method using irradiation with UV light, fine protrusions could be formed at high speed and stably, a polyester film superior in scratch resistance was obtained and, when a metal-coated magnetic layer was provided on the A layer side surface and a back coat layer was provided on the B layer side surface to produce a magnetic tape (ME tape), output characteristics of the magnetic tape became good.

EXAMPLE 11

An A/B/A three-layered laminated film was prepared.

As the polymer for the A layer (polyester A), polyethylene terephthalate polymerized in the conventional manner (polymerization catalysts: 0.20% by weight of magnesium acetate, 0.03% by weight of antimony trioxide and 0.20% by weight of dimethyl phenylphosphate as a phosphorus compound) was used (intrinsic viscosity: 0.63, melting point: 258° C., ΔTcg: 68° C., solution haze: 1.8%). As polyester B, polyester pellets without particles were used. The pellets were separately dried, and supplied to two extruders, respectively. The polyester A and polyester B were molted at 275° C. and 285° C., respectively, and laminated through a rectangular intermixing block (feed block) for three-layered lamination. The resultant laminate was caused to closely contact with a casting drum and cooled to solidify, thereby producing an A/B/A three-layered non-stretched film.

The non-stretched film was irradiation with UV light from the both surfaces under the conditions given in Table 4. The resultant film was stretched and heat-treated in the same manner as in Example 10, thereby obtaining a biaxially oriented polyester film with an A layer thickness of 1 μm and a whole thickness of 7 μm.

A magnetic coating and a non-magnetic coating were coated on the surface which did not contact with the casting drum, magnetically oriented and dried in the same manner as in Example 10. A back coat layer was formed on the opposite side of the film, calendered and then cured, thereby obtaining a cassette tape (MP tape) having a metal-coated magnetic layer thereon. By employing the UV irradiation conditions as shown in Table 4, although the diameters of the surface protrusions produced by UV irradiation became large, the surface protrusions could be formed at high speed and, therefore, a polyester film superior in scratch resistance and output characteristics in the form of a MP tape could be formed continuously.

COMPARATIVE EXAMPLE 5

A biaxially oriented polyester film and a cassette tape (MP tape) with a metal-coated magnetic layer were prepared substantially in the same manner as in Example 11, except that the non-stretched film was not irradiated with UV light. Since UV light was not irradiated, such problems occurred that fine protrusions could not be formed and friction between the film and the rolls during the film formation/slitting process was increased, causing scratches on the film surface. The scratch resistance of the film and output characteristics of the MP tape were deteriorated.

TABLE 4

| | Light source of UV light | | |
|---|---|---|---|
| Type | Relative intensity of light with 270–300 nm wavelengths (%) | Energy density during irradiation (J/cm$^2$) | Irradiation time (sec) |
| Ex. 10 Metal halide, parallel type | 38 | 3.0 | 2.5 |
| Ex. 11 Metal halide, converging type | 38 | 3.5 | 2.0 |

TABLE 5

| | Film configuration | Surface roughness (A) | | Difference in concentration of carboxyl groups between surface part and inside of thin layer | Surface portion containing no Protrusion with 10 nm or more in height | | |
|---|---|---|---|---|---|---|---|
| | | Ra (nm) | Rz/Ra | | Number of surface protrusions with 3–5 nm in height (×10⁴/mm²) | Ratio relative to the whole surface (%) | Grain size (nm²) |
| Ex. 10 | A/B | 8.5 | 14.1 | 0.017 | 120 | 25 | 800 |
| Ex. 11 | A/B/A | 19.2 | 13.7 | 0.018 | 500 | 30 | 4300 |
| C. Ex. 5 | A/B/A | 2.2 | 23 | 0.000 | 1 | 55 | 0.2 |

TABLE 6

| | Scratch resistance | Stability in surface protrusion formation | Output characteristics of ME tape |
|---|---|---|---|
| Ex. 10 | Excellent | ◯ | ◉ |
| Ex. 11 | Excellent | ◯ | ◯ |
| C. Ex. 5 | Unacceptable | X | X |

INDUSTRIAL APPLICABILITY

According to the production process for a polyester film of the present invention, fine protrusions can be formed on a surface of a polyester film extremely readily, a polyester film can be produced stably which exhibits good wear resistance and running durability and good output characteristics when used as a base film for a magnetic tape, and the film can be formed at high speed advantageously. Therefore, the present process is quite useful for production of polyester films in industrial scale.

The polyester film of the present invention produced by the present process is quite useful as a base film for a magnetic recording material, particularly for a magnetic recording medium having a ferromagnetic metal thin film layer thereon. In addition, the present polyester film can also be widely and effectively utilized for various film applications such as thermal transfer ribbons, heat-sensitive mimeograph stencils and electric capacitors.

What is claimed is:

1. A polyester film characterized in that a film surface portion containing no protrusion with 10 nm or more in height constitutes at least 5% of the whole film surface; and the number of protrusions with not less than 3 nm and less than 5 nm in protrusion height in the film surface portion is not less than $1\times10^6$/mm² and less than $1\times10^9$/mm².

2. A polyester film characterized in that fine protrusions are present on at least one surface of the film; the ratio of 10-point average roughness Rz to center line average roughness Ra (Rz/Ra) on the surface is less than 20; the concentration of carboxyl groups in the surface layer part of a thin layer which provides the surface is greater than that in the inside of the thin layer; a film surface portion that contains no protrusion with 10 nm or more in height constitutes at least 5% of the whole film surface; and the number of protrusions with not less than 3 nm and less than 5 nm in protrusion height in the film surface portion is not less than $1\times10^6$/mm² and less than $1\times10^9$/mm².

3. The polyester film according to claim 2, wherein the difference in concentration of carboxyl groups between the surface layer part of a thin layer which provides the surface having fine protrusions thereon and the inside of the thin layer is not less than 0.001.

4. The polyester film according to claim 1 or 2, wherein, in the film surface portion containing no protrusion with 10 nm or more in height, the grain size at the protrusion height threshold value of 3 nm is not less than 1 nm² and less than 5000 nm².

5. The polyester film according to claim 1 or 2, wherein particles having a particle diameter in the form of monodisperse particles and/or a primary particle diameter in the form of aggregate particles of not less than 1 nm and less than 300 nm are contained in an amount of not smaller than 0.01% by weight and smaller than 1% by weight.

6. The polyester film according to claim 1 or 2, wherein the film is a laminated film that has an A layer mainly composed of polyester A laminated on at least one surface of a B layer mainly composed of polyester B.

7. A magnetic recording medium comprising a magnetic layer provided on a surface having fine protrusions thereon of a polyester film as recited in claim 1 or 2.

8. The magnetic recording medium according to claim 7, wherein the magnetic recording medium is a cassette-type magnetic tape of a digital recording mode.

9. The magnetic recording medium according to claim 7, wherein the magnetic layer is a ferromagnetic metal thin film layer.

* * * * *